Figure 17:
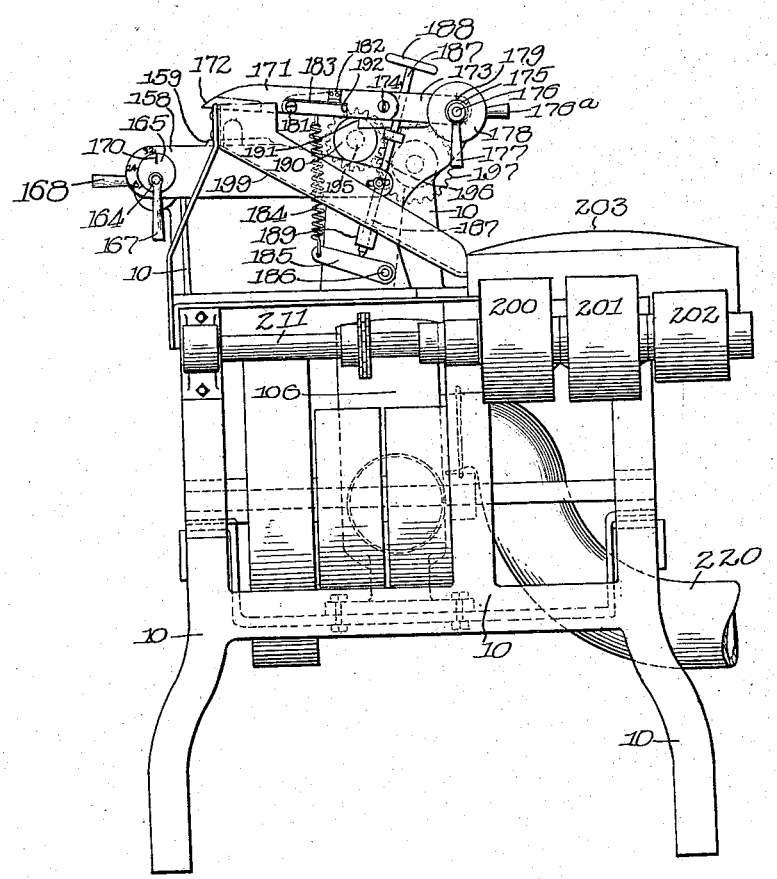

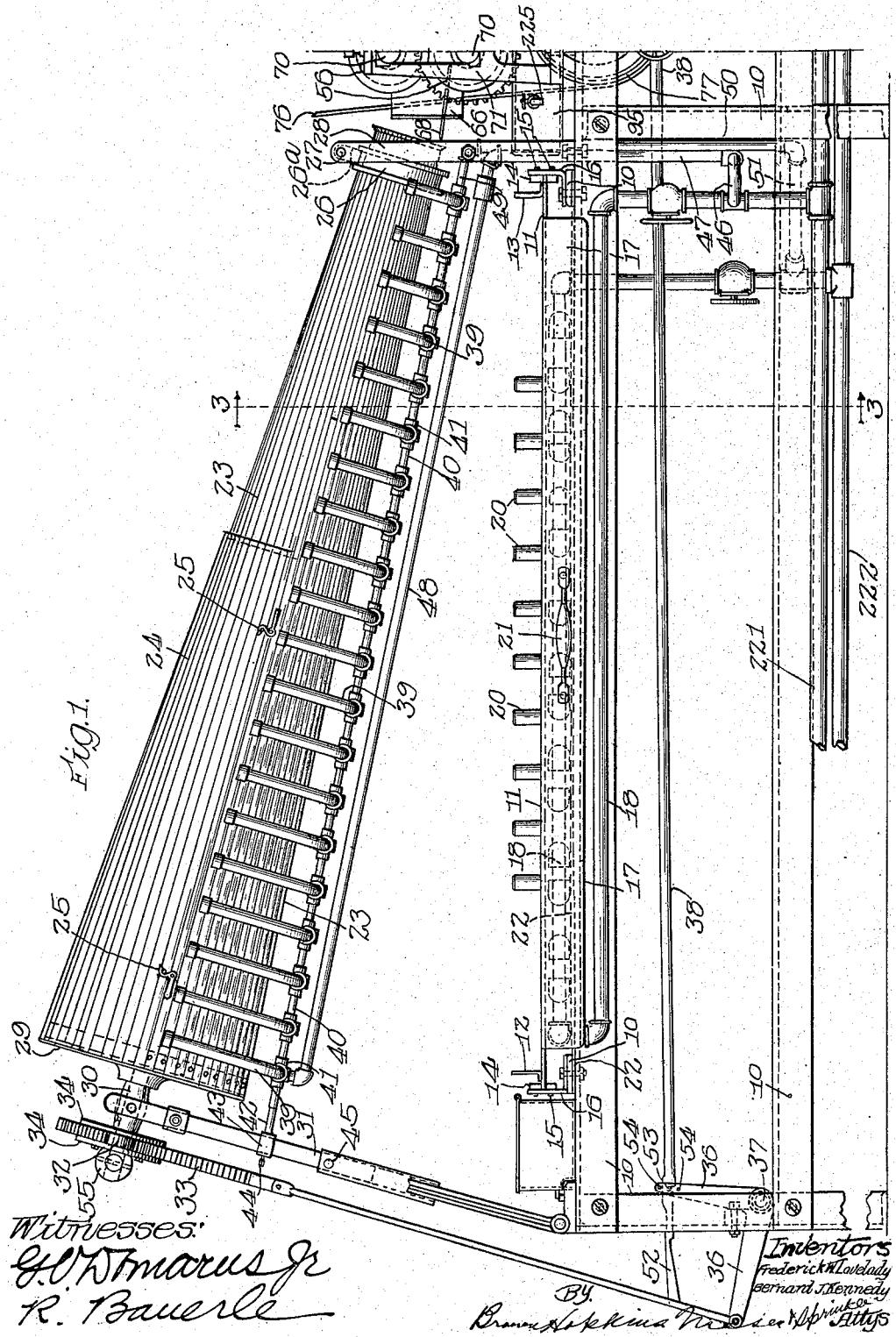

F. W. LOVELADY & B. J. KENNEDY.
CANDY MACHINE.
APPLICATION FILED DEC. 9, 1912.
1,166,610.
Patented Jan. 4, 1916.
11 SHEETS—SHEET 2.
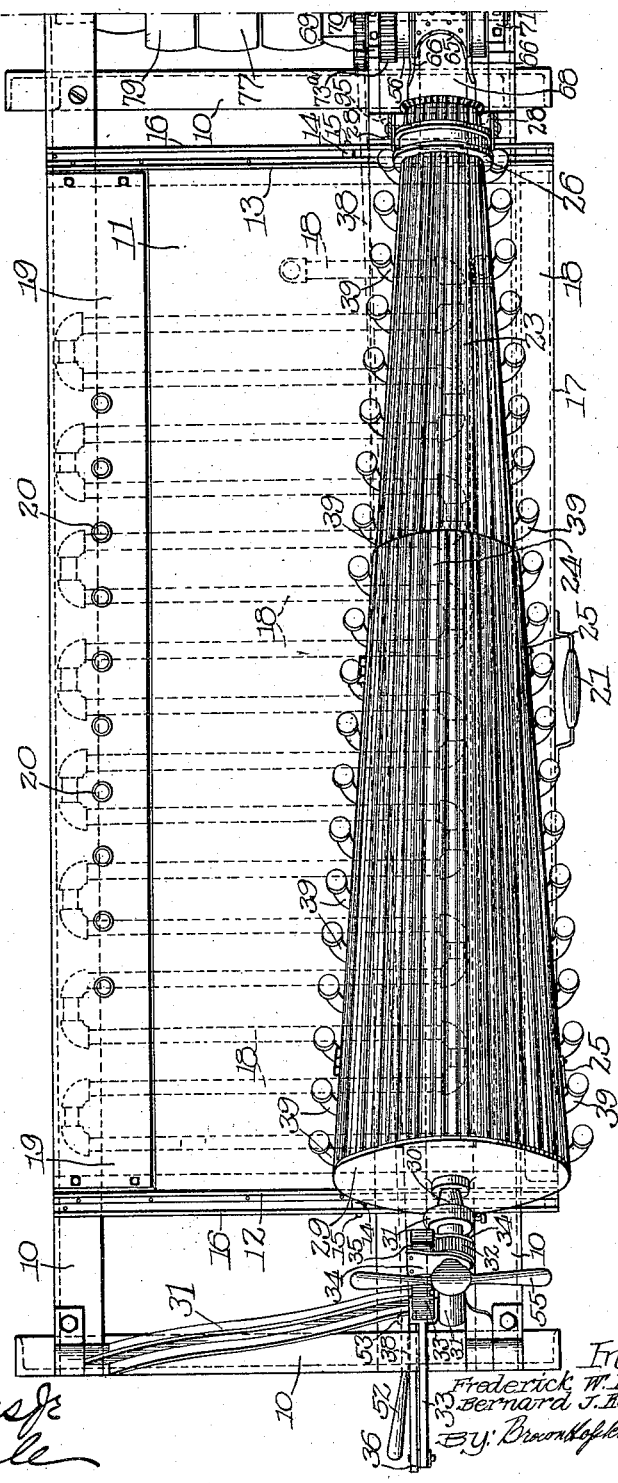

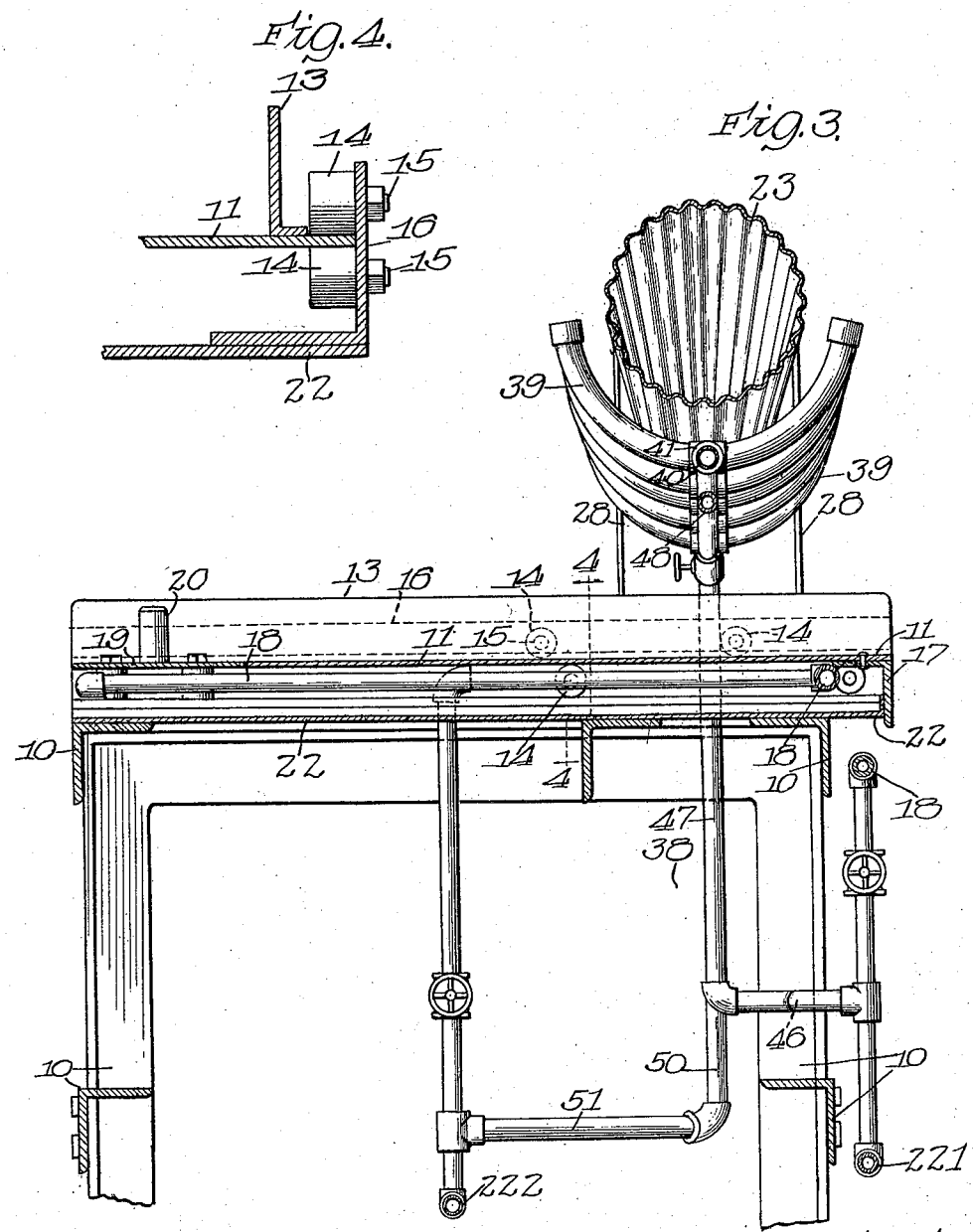

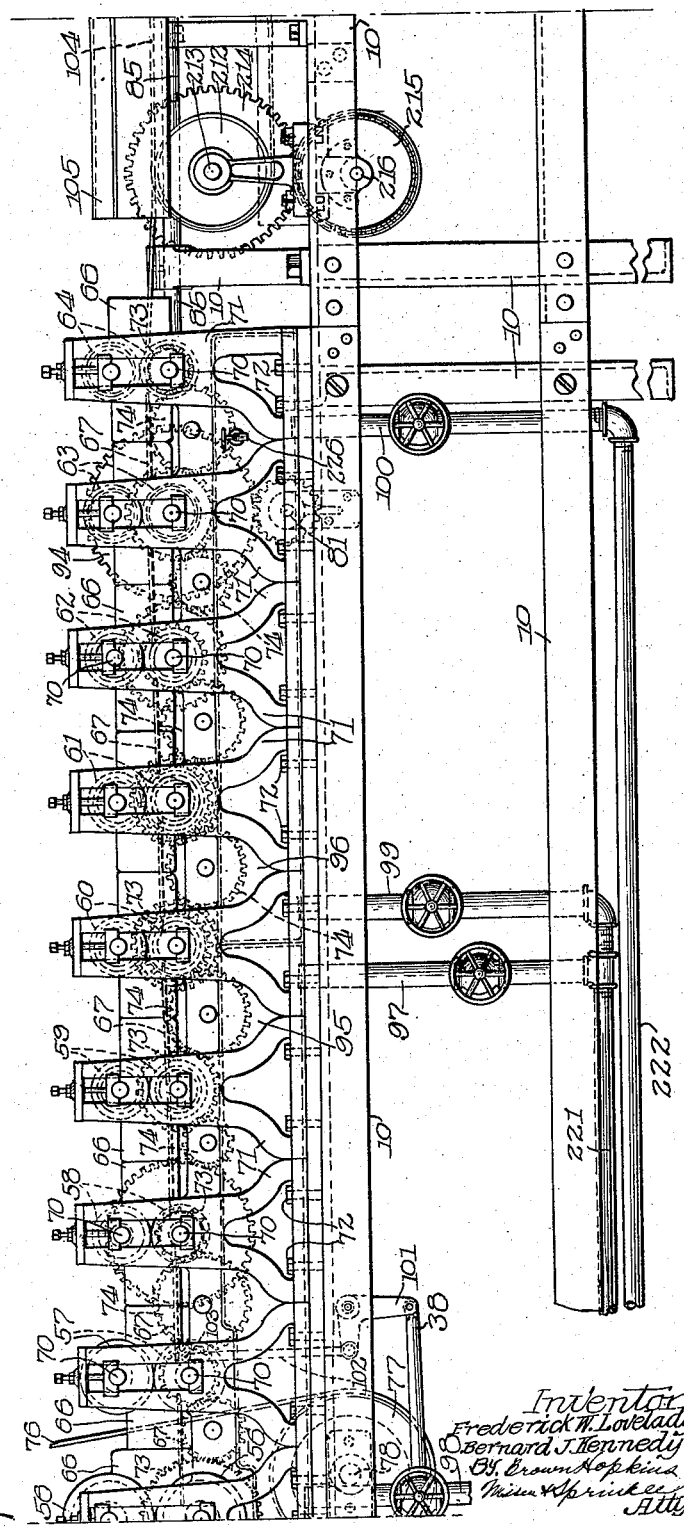

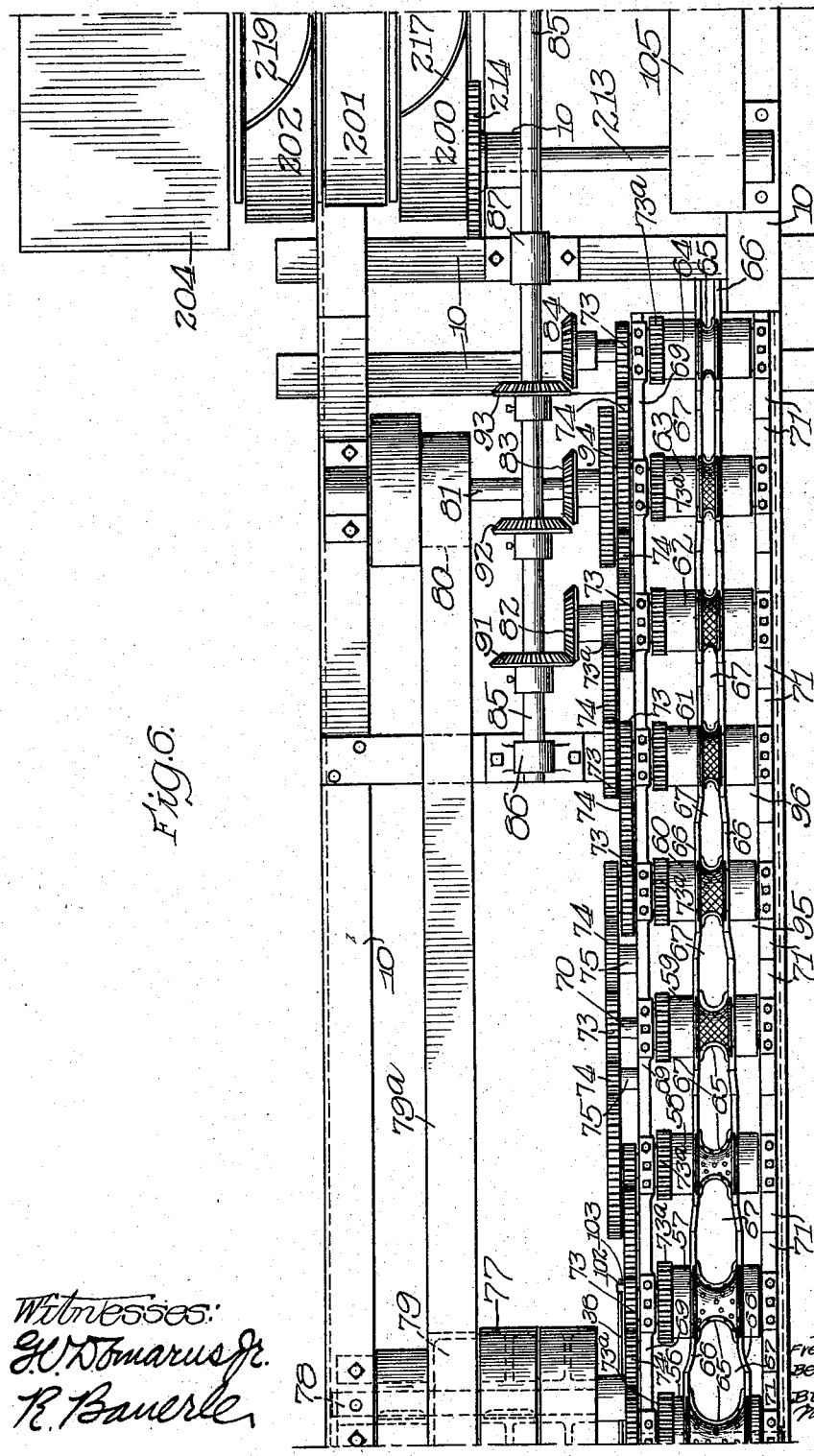

F. W. LOVELADY & B. J. KENNEDY.
CANDY MACHINE.
APPLICATION FILED DEC. 9, 1912.

1,166,610.

Patented Jan. 4, 1916.
11 SHEETS—SHEET 6.

F. W. LOVELADY & B. J. KENNEDY.
CANDY MACHINE.
APPLICATION FILED DEC. 9, 1912.
1,166,610.
Patented Jan. 4, 1916.
11 SHEETS—SHEET 7.
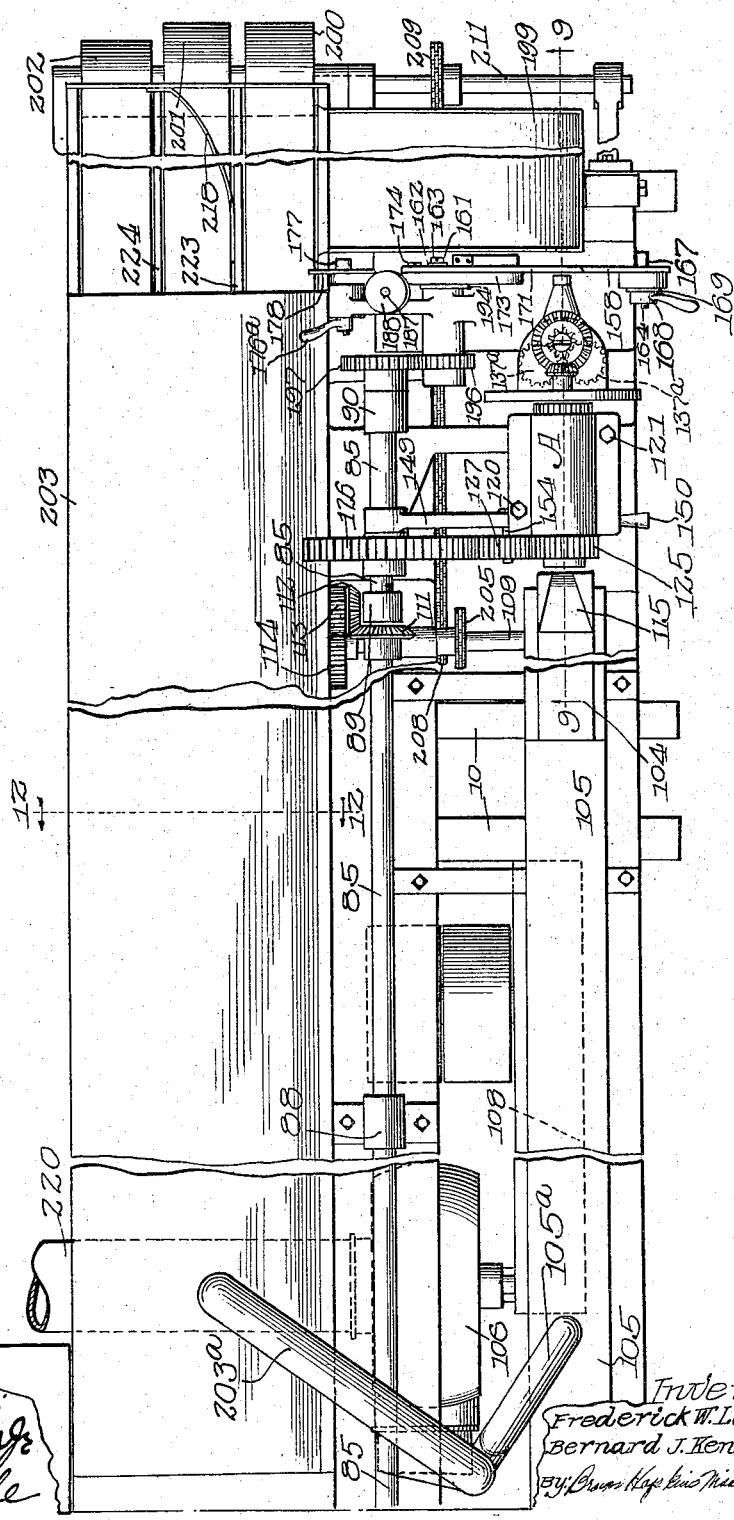

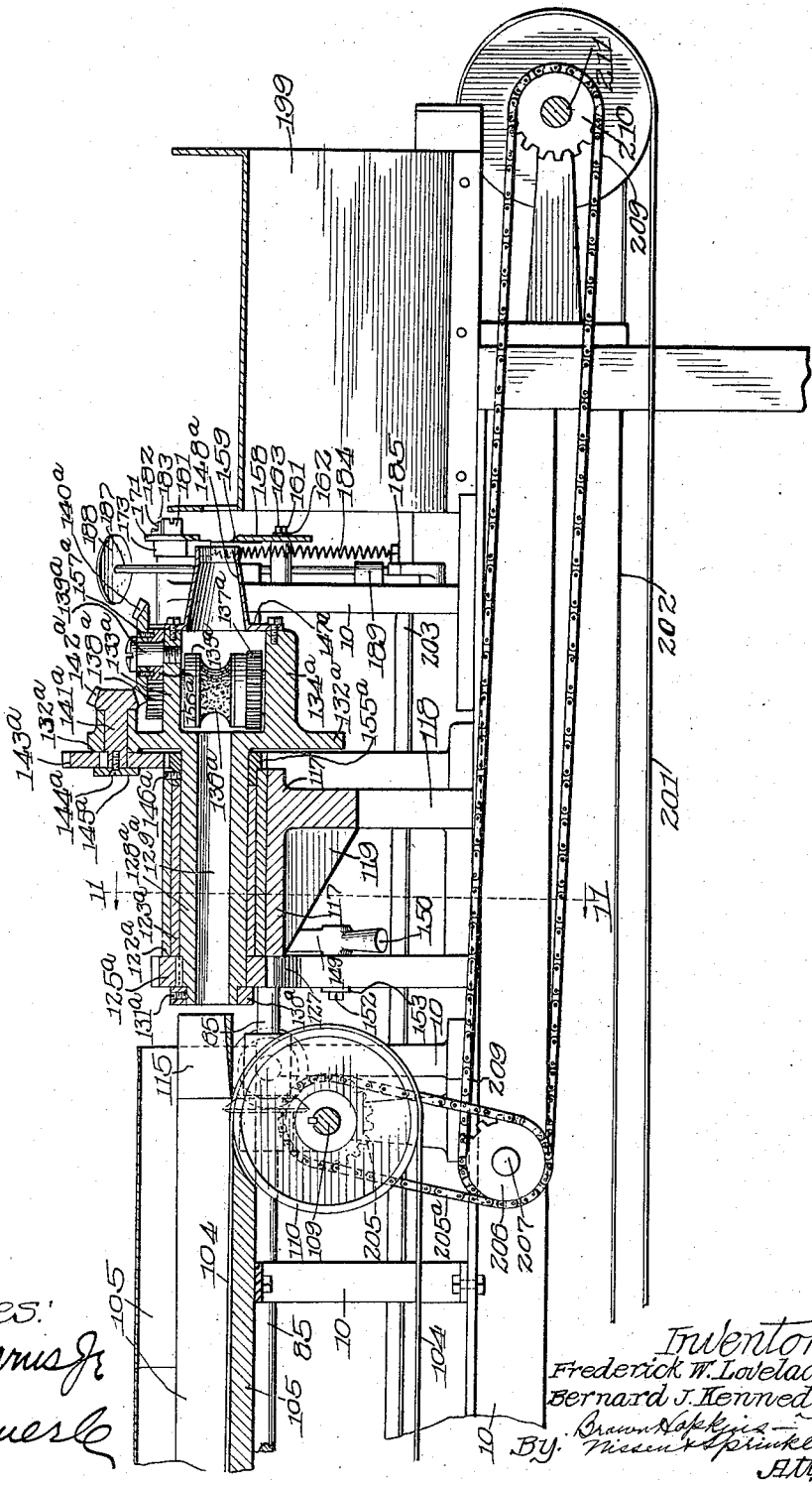

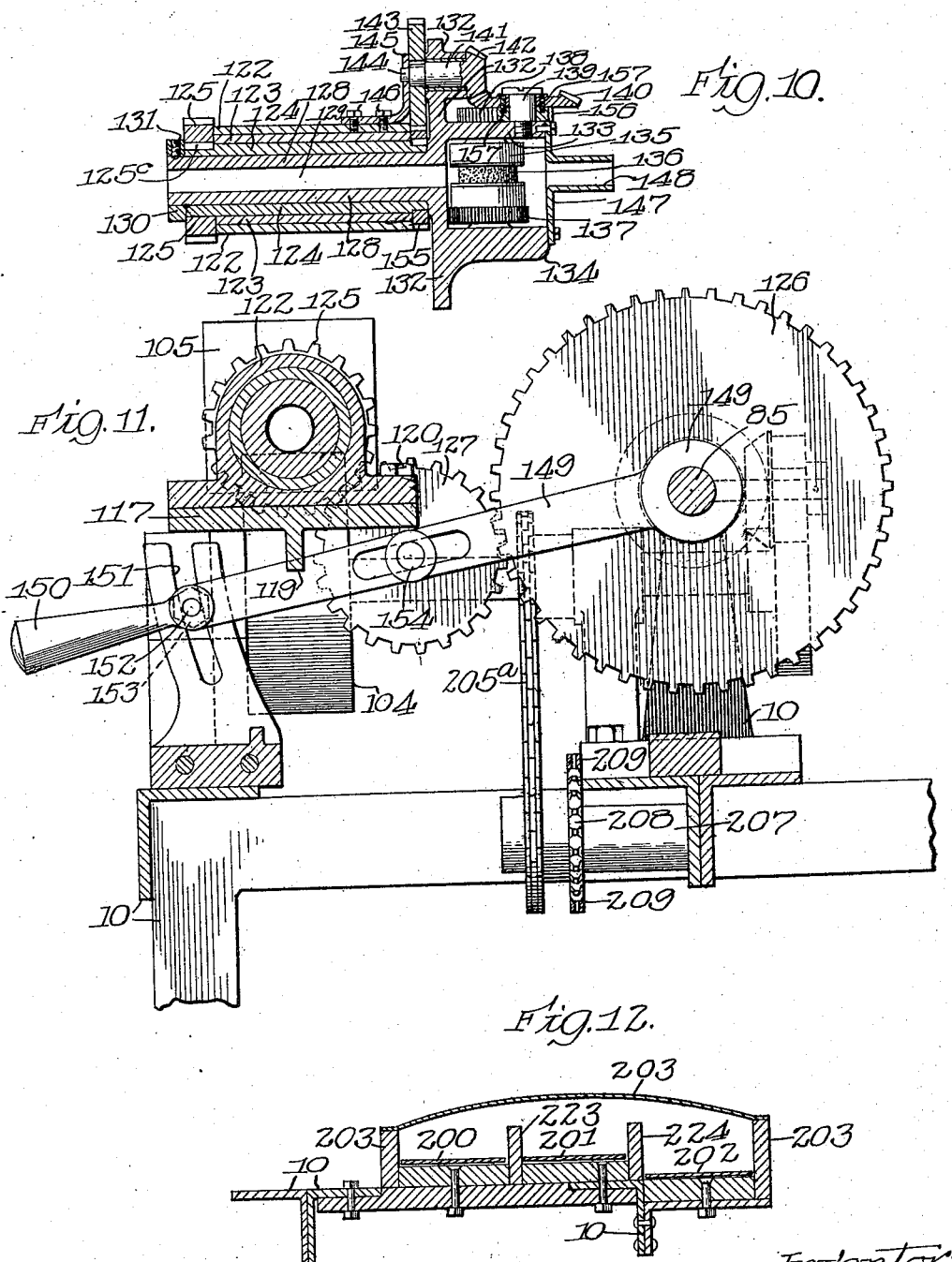

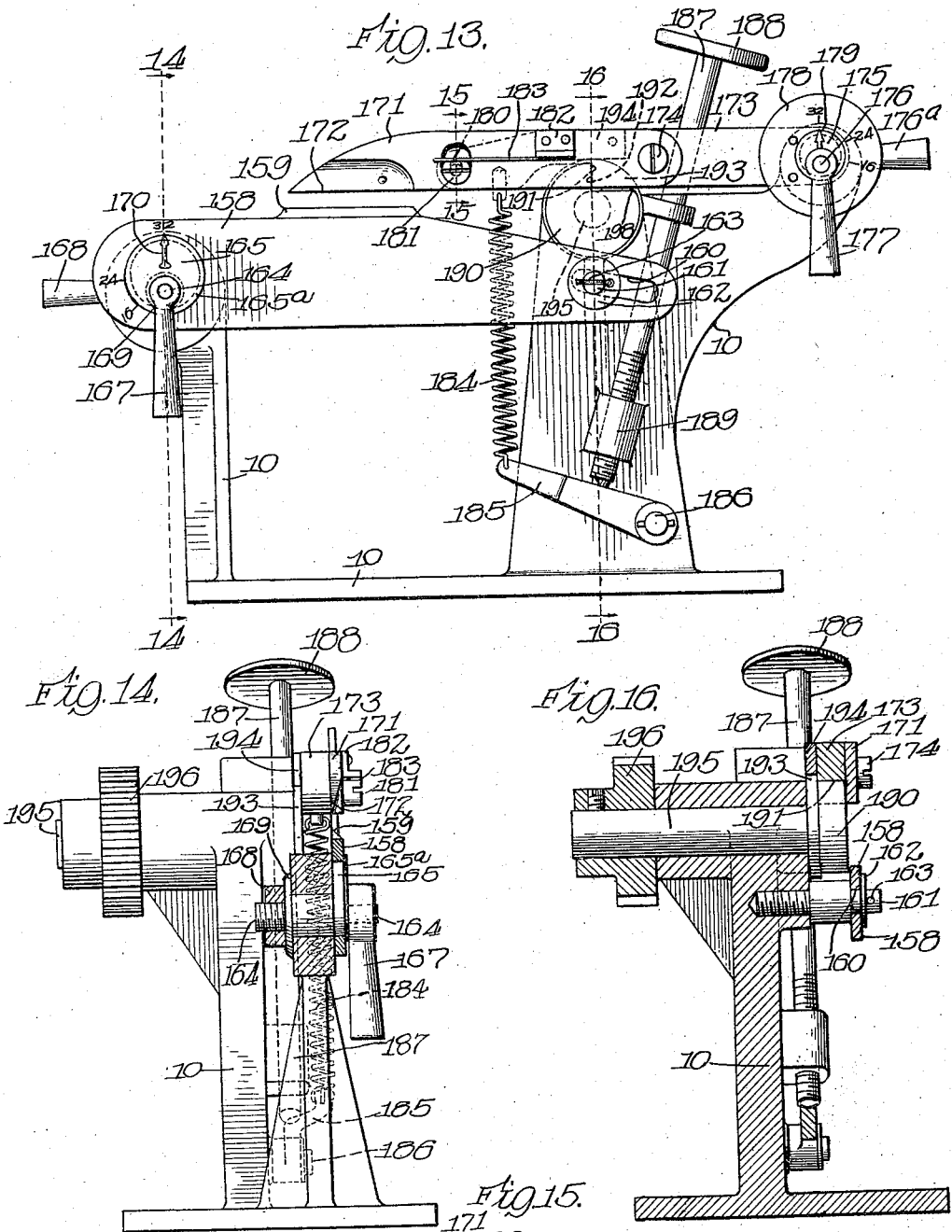

F. W. LOVELADY & B. J. KENNEDY.
CANDY MACHINE.
APPLICATION FILED DEC. 9, 1912.

1,166,610.

Patented Jan. 4, 1916.
11 SHEETS—SHEET 11.

Witnesses:
G. W. Tomarus Jr.
R. Bauerle

Inventors:
Frederick W. Lovelady
Bernard J. Kennedy
By: Brown Hopkins Nissen & Sprinkle
Attys.

UNITED STATES PATENT OFFICE.

FREDERICK W. LOVELADY, OF SAGINAW, AND BERNARD J. KENNEDY, OF DETROIT, MICHIGAN, ASSIGNORS OF ONE-THIRD TO GEORGE F. DICE, OF SAGINAW, MICHIGAN.

CANDY-MACHINE.

1,166,610.     Specification of Letters Patent.     Patented Jan. 4, 1916.

Application filed December 9, 1912. Serial No. 735,646.

*To all whom it may concern:*

Be it known that we, FREDERICK W. LOVELADY and BERNARD J. KENNEDY, citizens of the United States, residing, respectively, at Saginaw, in the county of Saginaw and State of Michigan, and at Detroit, in the county of Wayne and State of Michigan, have invented certain new and useful Improvements in Candy-Machines, of which the following is a specification.

This invention relates to candy machines and is in the nature of an improvement upon the machine set forth in United States Patent No. 1,002,411, granted to us September 5, 1911, for a candy machine, and on which application Serial No. 563,645 was filed May 26, 1910.

This invention has for its primary object the provision of an improved candy machine which shall have means for handling candy from the batch feeder to the packing table without manual operation.

A further object of this invention is the provision of an improved batch table, as a part of the machine, which shall have means for attempering the candy placed thereupon.

A further object of this invention is the provision of an improved batch feeder which shall have means for attempering the batch of candy placed therein, and shall have improved means for feeding the candy to the reducing rollers.

A further object of this invention is the provision of an improved reducing mechanism which shall render easy and rapid the process of interchange of rollers and which shall have means for attempering candy while in the reducing rollers.

A further object of this invention is the provision of means for attempering candy after it leaves the reducing rollers and before it enters the cutter feeder.

A further object of this invention is the provision of an improved cutter feeder which shall have improved means for feeding the candy to the cutter, and improved means for twisting the candy before it is cut, if such is desired.

A further object of this invention is the provision of an improved cutter.

A further object of this invention is the provision of means for attempering the candy after it has been cut and before its delivery at the packing table.

With the above and other objects in view this invention consists in the construction, combination, and arrangement of parts, all as hereinafter more fully described, claimed, and illustrated in the accompanying drawings which form a part of this specification and show the preferred embodiment of our invention.

In the drawings: Figure 1 is a side elevation of the batch table and the improved batch feeder. Fig. 2 is a top plan view thereof. Fig. 3 is a vertical section taken approximately on the line 3—3 of Fig. 1. Fig. 4 is a section of a portion of the batch table and frame and it is taken on the line 4—4 of Fig. 3. Fig. 5 is a side elevation of that portion of the machine bearing the reducing rollers. Fig. 6 is a top plan view thereof. Fig. 7 is a side elevation of those portions of the machine embodying the means for attempering the candy between the reducing rollers and the cutter feeder, the cutter feeder itself and the cutter. Fig. 8 is a top plan view thereof. Fig. 9 is an enlarged sectional view of a portion of Figs. 7 and 8 showing the cutter feeder arranged for twisting a round bar of candy, the section being taken on the line 9—9 of Fig. 8. Fig. 10 is another section of the cutter feeder showing it arranged for feeding a square stick without twisting it. Fig. 11 is a transverse sectional view of part of the machine taken on the line 11—11 of Fig. 9. Fig. 12 is a transverse section of that portion of the machine embodying means for attempering the candy after it has been cut and is taken on line 12—12 of Fig. 8. Fig. 13 is a side elevation of the cutting mechanism. Fig. 14 is a section of the cutting mechanism taken on the line 14—14 of Fig. 13. Fig. 15 is a section of a portion of the cutting mechanism taken on the line 15—15 of Fig. 13. Fig. 16 is a section of the cutting mechanism taken on the line 16—16 of Fig. 13. Fig. 17 is an elevation of the cutter end of the candy machine.

Briefly the operation of this machine is as follows: When a batch of candy has been cooked and pulled it is placed on a steam table which is provided with a slidable top and may be pulled from its position beneath the batch feeder until it is in a convenient place for the operator. Upon this table the plastic batch of pulled candy is molded into a conical shape approximating that of the batch feeder and, if desired, is here provided with parallel lines of striping. It is then placed in the batch feeder through an opening provided. The batch feeder is corrugated upon its inner surface and sufficiently tilted to cause the viscous batch to gravitate toward the reducing rollers. The batch feeder is also adapted to oscillate upon its own axis approximately two-thirds of a revolution, thus assisting the gravitation of the candy toward the reducing rollers. The reducing rollers are placed in pairs and provided with centrally located peripheral grooves adapted to draw the candy into a continuous bar. This bar is largest between the first two rollers and grows smaller until, when it leaves the last roller, it is of the shape and diameter desired in the finished product. After leaving the reducing rollers and before it is cut it is necessary that the candy be somewhat cooled and hardened and for that purpose it is passed from the reducing rollers onto an inclosed continuous belt upon which a cooling blast of air is thrown. From this belt the candy passes in a continuous line through the cutter feeder which draws it to the cutter where it is cut, by being nicked above and below, and falls in sticks of the desired length upon an inclined plane down which it rolls to a series of inclosed conveyer belts where, by means of a cooling blast of air, it is sufficiently cooled and hardened to be ready for packing after dropping from these final conveyer belts onto the packing table. The cutter feeder is provided with interchangeable heads and may be arranged either to feed the straight bar of candy to the cutter or to revolve and thereby twist the bar of candy before feeding it to the cutter. To keep the candy in a plastic condition there is provided about the batch feeder a semi-circular series vertically adjustable of valve controlled steam pipes. The cooling blasts of air are provided from a blower situated in any convenient place and operated, as are all the other running parts of the mechanism, from one source of power in a main shaft. The whole mechanism is mounted upon a suitable frame where it is at the most convenient height for the operator. When it is desired to change the shape or size of the finished product interchangeable sets of reducing rollers are used, and also interchangeable heads for the cutter feeder. In addition to this the cutter is adjustable for different shapes and sizes. Means are also provided for regulating the proportionate speeds of the various parts of the machine to accommodate it to the necessarily varying conditions required to produce differing goods. Means are further provided for changing the angle at which the batch feeder is set to increase or diminish, as necessity requires, the gravitation of the batch toward the reducing rollers.

Throughout the drawings reference numeral 10 indicates the main frame of the machine, the various parts of which are suitably fastened together and adapted to support, in their proper positions, the various portions of the machine.

A batch table 11 is slidably secured upon the frame 10 adjacent one end thereof and bears upwardly extending transverse plates 12 and 13 near its ends. Rollers 14 are provided to facilitate the sliding of the table and are journaled upon studs 15 bolted to angle irons 16 which find their support in attachment to the frame 10. A piece of angle iron 17 is fastened to the front edge of the batch table 11 and depends therefrom forming a lip which strengthens the table and serves to protect the operator from a steam pipe 18 disposed in loops below the table 11 and adapted to attemper a batch being shaped and striped upon it. The table 11 is slidably mounted and may be drawn forward from its closed position to present a convenient surface for the handling of the batch as well as to draw the batch from a position directly over the steam pipe 18 should it become too warm and soft. A plate 19 forming a continuation of the batch table 11 is rigidly secured to the frame 10 and preferably carries a plurality of studs 20, which serve to hold a set of rollers of different sizes from those in the machine, in a position where the steam pipe 18, which is also disposed below the plate 19, may warm them. A handle 21 is preferably provided upon the lip 17 for convenience in sliding the table 11 out and in. Disposed below the loops of the steam pipe 18 is a horizontal web or bottom plate 22 adapted to prevent too great radiation of steam downwardly and away from the table 11.

Superposed above the batch table 11 is a longitudinally corrugated conical batch feeder 23, a part of the body of which, as 24, is hinged and adapted to open for the admission of a batch of candy, after the insertion of which it may be closed and fastened in that position by any desirable means, as the latches 25. The batch feeder 23 is disposed with its smaller end toward the reducing rollers to be described later, and with its larger end preferably raised above the level of its smaller end. The smaller end is loosely mounted in a collar 26 carrying an arm 26ª extending upwardly from its periphery and pierced at its upper end for the engagement of a transverse bolt 27 which rests at its ends in supports 28, the arm 26ª being disposed adjacent the center of the bolt 27 and the supports 28 being disposed on either side of the collar 26. The smaller end of the batch feeder is open to allow passage of the candy from the batch feeder to the reducing rollers. A circular web 29 forms a closure for the larger end of the batch feeder 23 and carries at its center and extending outwardly a stud 30 which is journaled in the upper end of an adjustable support 31. The stud 30 extends outwardly from its engagement with the support 31 and carries a rigidly mounted pinion 32. A rack 33 engages the pinion 32 and is adapted by approximately vertical reciprocation to oscillate the batch feeder 23 upon its axis, the oscillation preferably being two-thirds of a revolution. Two arms 34 encircle stud 30 on either side of the pinion 32 and extend toward the rack 33 and on either side thereof and are engaged at their rearward ends by a web 35 all of which form a stirrup holding the teeth of the rack 33 in engagement with the teeth of the pinion 32. The rack 33 is adapted to receive its reciprocatory movement through a bell crank 36, attached adjacent the end of one of its arms to the lower end of rack 33, pivotally mounted as at 37, and attached adjacent the end of its other arm to a connecting rod 38 which receives its motion from the gears of the reducing mechanism to be described later. A series of semi-circular steam pipes 39 partially encircle and are spaced from the lower portion of the batch feeder 23 and extend approximately its entire length for the purpose of attempering the candy while in the batch feeder. A series of nipples 40 and cross T's 41 serve to join the series of semi-circular steam pipes 39 in an approximately straight line adjacent their centers. Extending outwardly from the pipes 39 nearest the large end of the batch feeder 23 is an arm 42 bearing a ring 43 which encircles the adjustable support 31 and bears a set screw 44 adapted to maintain the ring 43 in any desired position upon the adjustable support 31. The adjustable support 31 is adapted by the loosening and setting of a set screw 45 to raise or lower the larger end of the batch feeder and the series of pipes 39. Thus it will be seen that should the batch be found to flow too freely from the smaller end of the batch feeder the angle at which the batch feeder is inclined may be altered by lowering its larger end, or should the batch be found to pass too slowly from the smaller end of the batch feeder its larger end may be raised thereby increasing the pitch of the feeder. The loose mounting of the feeder in the collar 26 facilitates the oscillation of the feeder, mentioned above, and the swinging mounting of the collar 26 upon the bolt 27 facilitates the raising or lowering of the larger end of the batch feeder. By the loosening or setting of the set screw 44 the series of semi-circular steam pipes 39 may be brought closer to or drawn farther from the batch feeder, or, the set screw 44 remaining in its set position, the series of semi-circular steam pipes 39 may be caused to move upward or downward with the batch feeder maintaining their spaced relation therefrom. The pipes 39 receive their steam through an intake pipe 46 and its branches 47 and 48 and discharge waste steam through a nipple 49, an outlet pipe 50 and its branch 51. The connections between the intake branches 47 and 48 and between the outlet pipes 49 and 50 are sufficiently flexible to admit readily of the raising and lowering of the series of pipes 39. When so much of the batch has been drawn from the batch feeder that a very little remains and it is desired to place another batch in the feeder, means are provided for disconnecting the connecting rod 38 from its engagement with the bell crank 36 thus stopping the oscillation of the feeder while the remainder of the machine continues to operate upon what is left of the preceding batch. With the feeder stationary the latches 25 may be loosened, the portion 24 of the feeder opened, the batch inserted, the feeder closed, the connecting rod 38 re-attached to the bell crank 36 and the oscillation of the feeder resumed. For convenience in disconnecting rod 38 from the crank 36, the rod 38 carries at its outer end a handle 52 extending outwardly from the batch feeder end of the connecting rod 38, and the attaching means consists of a headed pin 53, which passes through a downwardly opening slot in the connecting rod 38 and engages any one of a series of holes 54 in one arm of the bell crank 36. When the rod 38 has been disconnected from the crank 36 it may happen that the latches 25 are in such a position that were the operator to attempt to loosen them he would burn his hands upon the steam pipes 39. For convenience in manually oscillating the batch feeder upon its axis, to properly locate the latches 25 for loosening, a handle 55 is provided keyed upon the outer end of the stud 30.

The candy upon leaving the smaller end of the batch feeder passes into the reducing mechanism which draws it into a continuous bar relatively large in diameter as it enters the reducing mechanism and of the lesser diameter desired in the finished product when it leaves the reducing mechanism. A plurality of reducing rollers 56, 57, 58, 59, 60, 61, 62, 63, and 64, in pairs, one roller of each pair being superposed above the other, constitute the reducing means. Each roller is provided adjacent its center with a peripheral groove 65; these grooves being preferably in exact alinement. The candy passes through the grooves and between the rollers, one roller being above and the other below the bar of candy. The candy passes first between the pair of rollers 56 which bear large grooves 65, and each succeeding pair of rollers bears somewhat reduced grooves; the smallest being the last pair (63) through which the candy passes. To guide the plastic bar of candy as it passes through the rollers, vertical guide plates 66 are provided which are disposed at either side of the grooves 65 and journaled upon the rollers in such manner that they will maintain their position while the rollers turn within them.

To support the candy in its passage through the rollers supporting plates 67 are provided disposed horizontally below the path of the candy and approximately level with the lower surface of the bar of candy. A similar supporting plate 68 extends from the rollers 56 toward and to a point adjacent the smaller end of the batch feeder to guide the candy into the reducing mechanism. The grooves in the rollers 56 to 63 inclusive preferably decrease in size as they extend from the batch feeder and they are all either roughened or knurled, as indicated, and their peripheral speed increases as they progress from the batch feeder in order to take care of the excess of material in the stick as drawn caused by the reduction in its cross sectional area. This mode of construction, however, is not followed out with respect to the details of the last pair of grooved rolls 64. These rolls, while they are grooved, the grooves therein are preferably smooth and the size of these grooves is not less than the size of the last preceding pair of rolls and is preferably a little larger. This pair of rolls 64 we call polishing rolls and they are speeded by suitable gearing so that their peripheral speed is very much greater than the speed of the preceding pair of rolls, and is also very much greater than the speed of the bar of candy. These rolls are also heated and being smooth and the groove large or larger than the preceding rolls they will have only a polishing effect on the stick; or, in other words, they do not draw when reduced to a stick. This is an important feature of our invention because the grooves in the preceding rolls are all roughened or knurled and the effect of this last pair of rapidly rotating smoothly grooved rolls is to polish the stick and relieve it from all roughening portions or indentations. This polishing effect is further continued during the twisting operation when the stick is in contact with the leather conveyer belt as will be hereinafter described.

A bracket 69 is provided at the rear of the rollers 56, 57, 58, 59, 60, 61, 62, 63 and 64 suitably attached to the frame 10, and in which are journaled the shafts 70 which turn the rollers. A series of brackets 71 is provided at the forward end of the rollers and attached by means of cap screws 72 to the frame 10. Within these brackets 71 are journaled the forward ends of the roller shafts 70. When the pair of rollers in the machine are to be removed and replaced with a series of rollers adapted to form a bar of candy of a different size or shape, the cap screws 72 may be withdrawn, the brackets 71 removed from their engagement with the roller shafts 70, the rollers in the machine slipped off the roller shafts 70, the desired differently grooved rollers placed in position upon the shafts 70, the brackets 71 returned to their engagement with the shafts 70 and fastened in position by the replacing of the cap screw 72. By this series of removable brackets the process of interchange of rollers is greatly facilitated. The lower series of shafts 70 extend rearwardly beyond the bracket 69 and carry upon their extensions a series of gears 73. Intermeshed gears 73ª upon the rearward ends of the reducing rollers convey the power from the lower roller to the upper roller of each pair. Between the gears 73 are interposed idlers 74 suitably journaled on studs 75 protruding from the bracket 69. The gears 73 and the idlers 74 are adapted to drive the different pairs of rollers at varying speeds, and by interchange of gears, when a change is made in the rollers, differing ratios of speed may be obtained between the various pairs of rollers. Motive power is brought to the machine by a belt 76 which drives a pulley wheel 77 and a shaft 78. Another pulley wheel 79 upon the shaft 78 conveys the power through a belt 79ª to a pulley wheel 80 upon a shaft 81 disposed below the pair of reducing rollers 63. From the shaft 81 power is transmitted through a pinion and a gear 94 to the lower roller shaft 70 of the pair of rollers 63 thence through the gears 73 and the idlers 74 to the various pairs of rollers.

It has been found by experiment that the best results are obtained from this machine by driving each successive pair of rollers into which the bar of candy passes at a slightly increased speed over the preceding pair. The roller shafts 70 of the rollers 62, 63, and 64, extend rearwardly beyond the gears 73 and idlers 74 and carry at their ends bevel gears 82, 83, and 84. A shaft 85 journaled in bearings 86, 87, 88, 89, and 90, suitably mounted upon the frame 10, is adapted to carry the power from the reducing mechanism onward to the cutter, conveyer belts, and other working parts of the machine. The shaft 85 bears upon its end nearest the reducing mechanism a plurality of bevel gears 91, 92, and 93, locked upon the shaft by set screws and each being adapted, by operation of the set screw, to be thrown into mesh with the respective adjacent bevel gears 82, 83 or 84. In operation one only of the pair of bevel gears 82—91, 83—92, 84—93, are adapted to be in mesh. As stated above, the rollers farthest from the batch feeder rotate at greater speed than those nearest it and the difference in speed is gradual, thus the bevel gear 84 turns at a greater speed than the bevel gear 83, and the bevel gear 83 turns at a greater speed than the bevel gear 82, hence when it is desired to rotate the shaft 85 at a considerable speed the bevel gear 93 is thrown into mesh with the bevel gear 84 and the gears 92 and 91 are thrown out of mesh with their respective gears 83 and 82. If it is desired that the shaft 85 turn at a lesser speed, gears 84 and 93 are thrown out of mesh and the gears 83 and 92 are thrown into mesh, and if a relatively slower speed is desired in the shaft 85 the gears 82 and 91 are thrown into mesh and the gears 83—92 and 84—93 are left out of mesh.

Two steam boxes 95 and 96 are longitudinally disposed below and adjacent the rollers of the reducing mechanism for the purpose of attempering the bar of candy passing through the rollers. The box 95 is adapted to receive its steam supply from a valve controlled inlet pipe 97 and to discharge its waste steam through a valve controlled outlet pipe 98. The steam box 96 is adapted to receive its steam supply from a valve controlled inlet pipe 99 and to discharge its exhaust steam through a valve controlled outlet pipe 100. The connecting rod 38, previously described, is attached at its end farthest from the batch feeder to one arm of a bell crank 101, the other arm of the bell crank 101 being attached to a driving rod 102 which extends upwardly to engagement with a crank pin 103 eccentrically mounted upon the gear 73 of the lower roller of the pair 57. Thus the motive power brought from the shaft 81 through the gears 73 and the idlers 74 is conveyed through the crank pin 103, the driving rod 102, the bell crank 101, the connecting rod 38, and the bell crank 36 to the rack 33 for the purpose of oscillating the batch feeder 23.

As the candy leaves the reducing mechanism it is of a warm, soft, yielding consistency, and to prepare it properly for cutting it must be slightly cooled and hardened. This partial cooling and hardening takes place on a carrier belt 104 upon which the bar of candy is carried from the reducing mechanism to the cutter feeder to be described later. That part of the carrier belt 104 which carries the candy is inclosed in an air chamber 105. Any suitable form of blower, indicated at 106 and driven from a shaft 107 by means of a pulley 107ᵃ and a belt 108 furnishes a cooling blast of air to the chamber 105 through a connecting pipe 105ᵃ for the purpose, stated above, of partially cooling the candy. The carrier belt 104 receives its power at its end farthest from the reducing mechanism from a shaft 109 through a pulley 110. From the shaft 85, previously described, power is transmitted to the shaft 109 by means of bevel gears 111 and 112, a pinion 113 and a gear wheel 114; the bevel gear 111 being secured upon the shaft 85.

A trough shaped guide member 115 guides the still unbroken bar of candy from the carrier belt 104 to a cutter feeder indicated generally at A in Figs. 7 and 8. This cutter feeder serves to draw the candy from the carrier belt and feed it to the cutter to be described later. In addition to its feeding function the cutter feeder, by means of interchange of a set of parts, may be used likewise to twist the bar of candy before it is fed to the cutter. In order to adapt the cutter feeder to the manufacture of differently shaped and sized goods various sets of interchangeable parts are provided. For convenience in description the various interchangeable sets of parts will be termed "feeder heads." Supported by the frame 10 is a bed plate 117 held at a convenient level above the frame 10 by means of an upright support 118, preferably integral with the bed plate. A triangular and preferably integral web 119 serves as a brace between the bed plate 117 and its upright support 118. The various interchangeable feeder heads are each adapted to be placed upon and fastened to the bed plate 117, any convenient attaching means being employed, such as the bolts 120 and 121.

In Fig. 10 is shown in section a feeder head whose function is to draw from the carrier belt and feed to the cutter a square bar of candy. In Fig. 9 is shown in section a feeder head adapted to draw from the carrier belt, to twist, and to feed to the cutter a round bar of candy. 122 is a cylindrical journal box provided with a flat base and adapted to be attached to the bed plate 117 by the fastening bolts 120 and 121. The journal box 122 is lined with a cylindrical bearing 123, preferably formed of Babbitt metal. Disposed within the bearing 123 is a tubular power shaft 124 bearing at its end nearest the carrier belt a gear wheel 125 keyed at 125ᶜ to the tubular power shaft 124 and adapted to receive power from the shaft 85 through a gear wheel 126 upon the shaft 85, and an idler 127. The idler 127 is mounted upon a slotted arm 149 and intermediate the ends thereof. The arm 149 at one end encircles the shaft 85 and is adapted to oscillate upon the shaft 85 as a center through a small segment of a circle. The opposite end of the arm 149 is provided with a handle 150 for convenience in causing this oscillation. A portion of the frame 10 is slotted as at 151 and in engagement with slot 151 is a transverse bolt 152, with a lock nut 153, which passes through a hole in the arm 149 and is adapted to fasten the arm in any desired place in the slot 151. The gear wheel 127 is journaled in the slot of the arm 149 by means of a shaft 154 and is adapted to be constantly in mesh with the gear wheel 126. When it is desired to make an interchange of feeder heads the lock nut 153 is loosened and the gear wheel 127 thrown out of mesh with the gear wheel 125 by lowering the outer or hand end of the arm 149. After the interchange of feeder heads has been accomplished the outer end of the arm 149 may be again raised until the gear wheel 127 is again in mesh with the gear wheel 125. Disposed within the tubular power shaft 124 is a portion of a feeder frame 128 centrally channeled with a square hole 129 for the passage of a square stick of candy, the channel 129 being preferably at the same level as the guide member 115, horizontally disposed and placed adjacent the guide member 115. The feeder frame 128 extends at its end nearest the carrier belt somewhat beyond the adjacent end of the tubular power shaft 124 and is there provided with a thrust collar 130 and a set screw 131 which serve to hold this end of the feeder frame in its proper position with relation to the journal box 122, the bearing 123, the tubular power shaft 124, and the gear wheel 125. At the end farthest from the carrier belt the feeder frame bears at right angles to the axis of its squarely channeled portion a plate 132 preferably integral with the squarely channeled portion. Upon the outer face of the plate 132 and extending outwardly at right angles thereto are two parallel flat shoulders 133 and 134 in which are journaled the shafts of two rollers 135 placed side by side with their axis parallel. The rollers 135 are each provided centrally with peripheral square grooves 136, the two grooves 136 meeting between the rollers in alinement with the square channel 129 of the feeder frame 128. The grooves 136 are preferably lined with vulcanized rubber or other suitable flexible material adapted to afford means for firmly gripping the candy. On two of their adjacent ends the rollers 135 carry intermeshed gear wheels 137, and attached to the shaft of one of the rollers 135 adjacent the shoulder 133 but on the side thereof opposite the rollers is keyed a gear wheel 138. Secured to the shoulder 133 extending outwardly therefrom at right angles and on the same side of the shoulder as the gear wheel 138 is a stud 139 upon which is journaled a pinion 156 in mesh with the gear wheel 138 and locked by means of set screws 157 to a bevel gear 140, the pinion 156 and the bevel gear 140 being adapted to rotate together upon the stud 139. Through the plate 132 at a point adjacent the shoulder 133 is journaled at right angles a shaft 141 bearing upon its outer end a bevel gear 142 in mesh with bevel gear 140, and bearing on its inner end a gear wheel 143 and a rounded extension 144. The gear wheel 143 is adapted to be constantly in mesh with a gear wheel 155 keyed upon the tubular power shaft 124 at its end farthest from the carrier belt. An angle brace 145 is bolted to the journal box 122 by means of cap screws 146 and encircles the rounded extension 144, thereby holding the feeder frame 128, with all its attached parts, from relative rotation within the journal box 122. A web 147 connects the outer ends of the shoulders 133 and 134 and bears an outwardly extending square tube 148 in alinement with the channel 129 and the meeting of the grooves 136, the square tube 148 forming a guide for the candy to the cutter to be described later.

In the operation of the non-twisting feeder head shown in Fig. 10 the power of the shaft 85 is conveyed through the gear wheels 126, 127, and 125, to the tubular power shaft 124 which rotates about the square channeled portion of the feeder frame 128 and within the Babbitt metal bearing 123. The journal box 122 remains stationary being bolted, as previously stated, to the bed plate 117. By means of the angled brace 145 the feeder frame 128 is held stationary. As the tubular power shaft 124 rotates it carries with it the gear wheel 155 which rotates the gear wheel 143, the bevel gears 142 and 140, the gear wheels 156 and 138, and the grooved rollers 135, the grooved rollers 135 rotating in such manner that their adjacent peripheries travel in the same direction, thereby drawing the candy through the square channel 129 and feeding it into the square tube 148 whence it passes to the cutter to be described later.

As stated above, the feeder head shown in section in Fig. 9 is adapted to both feed the continuous bar of candy to the cutter and to twist it before it reaches the cutter. 122$^a$ is a cylindrical journal box bearing a flat base adapted to be bolted by means of the bolts 120 and 121 to the bed plate 117. Lining this journal box is a bearing 123$^a$ preferably formed of Babbitt metal. Disposed within the bearing 123$^a$ is a cylindrical tubular portion of a feeder frame 128$^a$ which is centrally bored as at 129$^a$ to admit of the passage of a round bar of candy. Upon that end of the feeder frame 128$^a$ nearest the carrier belt is a thrust collar 130$^a$ locked about the extended end of the feeder frame by means of a set screw 131$^a$. Keyed to the feeder frame 128$^a$ adjacent the collar 130$^a$ is a gear wheel 125$^a$. At its end farthest from the carrier belt the feeder frame 128$^a$ carried at right angles to its centrally channeled portion a plate 132ª bearing upon its face and outwardly extending at right angles two parallel flat shoulders 133ª and 134ª, in which are journaled the shafts which carry a pair of rotating rollers 135ª. These rollers bear centrally disposed peripheral grooves preferably lined with vulcanized rubber or other suitable somewhat flexible material adapted to afford means for firmly gripping the candy as indicated at 136ª between which the bar of candy is drawn from the round channel 129ª and upon two of their adjacent ends, the rollers 125ª carrying meshed gear wheels 137ª. The shaft upon which one of the rollers 135ª is carried extends outwardly from the shoulder 133ª on the side opposite the roller and carries keyed to it a gear wheel 138ª. Secured to the shoulder 133ª and extending outwardly at right angles on the same side of the shoulder as the gear wheel 138ª is a stud 139ª upon which is journaled a pinion 156ª in mesh with the gear wheel 138ª and locked by means of set screws 157ª to a bevel gear 140ª, the pinion 156ª and the bevel gear 140ª being adapted to rotate together upon the stud 139ª. Journaled in the plate 132ª at right angles thereto and disposed adjacent the shoulder 133ª is a shaft 141ª carrying on one of its ends a bevel gear 142ª in mesh with the bevel gear 140ª. At the opposite end of the shaft 141ª is a gear wheel 143ª keyed to the shaft and secured from longitudinal motion thereon by means of a machine screw 144ª and the plate 145ª. A gear wheel 155ª in mesh with gear wheel 143ª is disposed about the centrally channeled portion 128ª of the feeder frame, and by means of a machine screw 146ª is locked to the journal box 122ª to prevent relative rotation therewith. A web 147ª joins the outer ends of the parallel flat shoulders 133ª and 134ª and bears centrally disposed and in alinement with the channel 129ª and the meeting of the grooves 136ª of the rollers 135ª a tubular conical guide member 148ª which serves to guide the bar of candy from the feeding rollers 135ª to the cutter to be described later.

In the operation of the feeder head shown in Fig. 9 the power from the shaft 85 is carried through the gear wheels 126, 127, and 125ª to the feeder frame 128ª which is caused to rotate within the Babbitt metal bearing 123ª upon the axis of the central channel 129ª, all the parts of the feeder frame, including the outwardly protruding shoulders 133ª and 134ª, the feeder rollers 135ª, the gears 137ª, 138ª, 156ª, 140ª, 142ª and 143ª, rotating with the feeder frame upon this same axis, namely, the axis of the central channel 129ª. Inasmuch as the gear wheel 155ª is locked into stationary position with the journal box 122ª by means of the machine screw 146ª, the gear wheel 143ª which remains in mesh with the gear wheel 155ª, is made to rotate upon its own axis as, carried in the plate 132ª of the feeder frame, it rotates about the axis of the central channel 129ª, thereby rotating the shaft 141ª, the bevel gears 142ª and 140ª, the pinion 156ª, the gear 138ª and the rollers 135ª. As the continuous bar of candy is drawn through the rollers of the feeder head shown in Fig. 9 toward the cutter it is also twisted. It is seen that the feeding rollers 135ª have a double motion; each rotates upon its own axis and together they rotate in the plane of their own axes upon the axis of the central channel 129ª. The rotation of the feeding rollers upon their own axes performs the feeding function by drawing the bar of candy from the carrier belt and pushing it through the conical tube 148ª to the cutter, while the rotation of the feeding rollers upon the axis of the central channel 129ª has a torsional action upon the bar of candy.

Located adjacent the cutter feeder and adapted to receive the bar of candy directly therefrom is the cutter which is adapted to sever the candy into predetermined lengths by nicking the bar of candy both above and below as it passes out of the cutter feeder. An approximately horizontal anvil 158 disposed transversely with relation to the bar of candy coming from the cutter feeder bears on its upper surface and upwardly protruding a cutting edge 159 across which the bar of candy is fed. It is at times desired to raise or lower the edge 159 while retaining it in an approximately horizontal position. To attain this purpose the anvil 158, at its rearward end, is pierced by an upwardly inclined slot 160 which is disposed about a horizontal stud 161 secured to the frame 10. A washer 162 and a cotter pin 163 adjacent the free end of the stud 161 serve to prevent the disengagement of the slotted end of the anvil and the stud 161. The width of the slot 160 is sufficient to allow the rearward end of the anvil to slide upon the bolt. Journaled in the frame 10 at right angles to the greatest length of the anvil 158 is a horizontal shaft 164 to which is eccentrically secured a circular cam 165 upon whose periphery is journaled the forward end of the anvil 158. Upon one end of the shaft 164 is secured a handle 167 rigidly attached to the shaft and adapted, when desired, to rotate the eccentric cam 165 and the shaft 164, thereby raising or lowering the anvil 158. A handled lock nut 168, flanged as at 169 and threaded upon the opposite end of the shaft 164, is adapted, when screwed down, to hold the eccentric cam 165 and the anvil 158 stationary in any desired position. The cutting edge 159 may be raised or lowered by loosening the lock nut 168 and rotating the eccentric cam 165 within the forward end of the anvil and upon the shaft 164 as an axis.

An arrow-shaped indicator 170 upon the surface of the cam 165 is adapted to register with any desired one of a series of graduations upon the adjacent surface of the anvil. The graduations have direct relation to the diameter of the bar of candy to be cut. If, for instance, there are to be 32 sticks of candy to the pound the indicator 170 will be set to register with a graduation marked 32. Should it be desired to cut 24 to the pound, which would ordinarily be thicker sticks, the eccentric cam 165 is rotated until the indicator 170 registers with a graduation marked 24, and similarly the eccentric cam may be rotated until the indicator 170 registers with a graduation 16 when it is desired to cut sticks of candy 16 of which make a pound. By this means the edge 159 is kept at the same level as the lower surface of the bar of candy coming from the cutter feeder. Disposed above the anvil 158 and in approximately the same plane is a knife 171 having an edge 172 disposed directly above the cutting edge 159 of the anvil but spaced therefrom. The knife 171 overlaps and at its rearward end is pivoted upon a knife holder 173; the pivot being formed preferably by a cap screw 174. The knife holder 173 is pivoted at its rearward end upon a circular cam 175 eccentrically mounted upon a shaft 176 supported horizontally and at right angles to the plane of the knife holder in the frame 10. Upon one end of the shaft 176 is secured a handle 177 rigidly attached to the shaft and adapted, when desired, to rotate the eccentric cam 175 upon the shaft 176 as an axis, thereby raising or lowering the rearward end of the knife holder 173. A lock nut 176ª upon the opposite end of the shaft 176 is adapted, when screwed down, to hold the eccentric cam 175 stationary while allowing the knife holder 173 to oscillate upon the eccentric cam 175 as a pivot. A graduated dial 178 encircles the cam 175 and an arrow shaped indicator 179 upon the surface of the eccentric cam 175 is adapted to register with graduations upon the dial. The knife 171 is slotted as at 180 opposite the forward end of the knife holder 173. A cap screw 181 passes through the knife 171 into threaded engagement with a hole in the forward end of the knife holder, the hole registering with the slot 180. An angled arm 182 is secured upon the side of the knife 171 and carries a flat spring member 183 securely fastened thereto with its free end seated upon the protruding head of the cap screw 181. A tension spring 184 secured to the knife holder 173 adjacent its forward end depends therefrom and is attached at its lower end to one end of an arm 185, which is at its opposite end pivotally journaled upon a horizontal stud 186 set in the frame 10. The downward pull of the tension spring 184 holds the edge 172 of the knife normally in definite spaced relation to the edge 159 of the anvil. Should it be desired to increase the tension of the spring 184, a threaded bolt 187 vertically disposed and bearing at its upper end a handle 188 is adapted to contact with the upper edge of the arm 185 intermediate its ends and by rotation within a threaded ear 189 upon the frame 10 to adjust the arm 185 downwardly. Should it be desired to loosen the tension of the spring 184 the rotation of the bolt 187 in an opposite direction will permit the spring to shorten and to raise the arm 185.

Disposed directly below the knife holder 173 is a jumping cam 190 having a sharp shoulder 191 which, when in a vertical position, engages a notch 192 in the lower edge of the knife holder 173. Upon one of its sides the circular jumping cam 190 is provided with an enlarged peripheral flange 193 upon which impinges a protecting plate 194 secured to the side of the knife holder opposite to that on which the knife 171 is pivoted. The jumping cam 190 is centrally keyed upon a shaft 195 which is journaled horizontally in the frame 10 and carries at its opposite end a pinion 196. A gear wheel 197 keyed upon the shaft 85 and in mesh with the pinion 196 is adapted to rotate the shaft 195 and the jumping cam 190. The cam 190 is provided with a rounded shoulder 198 and as the cam rotates, the free end of the knife holder rises upon the rounded shoulder 198 against the tension of the spring 184 and rides upon the periphery of the jumping cam carrying up with it the knife 171. The rotation of the jumping cam 190 brings the sharp shoulder 191 past the notch 192 of the knife holder, whereupon the tension spring 184 pulls the knife holder violently downward. It is arrested in its downward drop by the impinging of the protection plate 194 against the peripheral flange 193 of the jumping cam but the free end of the pivoted knife 171 is carried by its momentum downward toward the cutting edge 159 of the anvil which brings into tension the flat spring 183. The tension of the flat spring 183 draws the knife 171 instantly back to its normal spaced relation above the cutting edge 159. By this operation two nicks are put in the bar of candy, one in its lower surface made by the edge 159, the other in its upper surface made by the knife edge 172. The smart blow delivered by the knife edge 172 serves to sever the candy at the point struck and the instant withdrawal of the edge 172 from the nick it has made in the candy by means of the action of the flat spring 183, is provided to prevent any retarding and buckling of the bar of candy constantly coming from the cutter feeder.

As the sticks of candy are severed from the bar by the cutter they drop upon an inclined plane or chute 199 down which they roll onto the first of a series of approximately horizontal conveyer belts 200, 201, 202, disposed longitudinally at the rear of the machine and at a lower level than the cutting edge 159. The conveyer belts 200, 201, and 202, are inclosed by a cover 203 into which is carried a blast of air from the blower 106 through a connecting pipe 203ª which cools the candy as it travels along the conveyer belts until it is sufficiently hard to be packed, when it drops from the last conveyer belt onto a packing table indicated at 204. A sprocket wheel 205 (see Fig. 9) keyed upon the shaft 109 through a chain 205ª drives a sprocket wheel 206 and a shaft 207 journaled upon the frame 10 at a point below the shaft 109. By means of a sprocket wheel 208 (see Fig. 8) keyed upon the shaft 207 and a chain 209 power is carried to a sprocket wheel 210 keyed upon a shaft 211, disposed adjacent the candy chute 199 and upon which are carried one set of pulleys over which the conveyer belts 200, 201, and 202 travel. The power to operate the conveyer belt 201 is transmitted from the shaft 211, the pulley upon which the belts 200 and 202 travel being adapted to idle upon the shaft 211. The power which operates the conveyer belts 200 and 202 comes from the carrier belt 104 (see Fig. 5) which, at its end nearest the reducing mechanism, drives a pulley 212 keyed upon a shaft 213 which bears a gear wheel 214 in mesh with a pinion 215 keyed upon a shaft 216 disposed below and parallel to the shaft 213. The shaft 216 carries the other set of pulleys over which the conveyer belts 200, 201 and 202 travel; (see Fig. 6). The pulley on the shaft 216, over which the conveyer belt 201 travels, idles upon the shaft 216, the belt 201, as previously stated, receiving its power from the shaft 211. The pulleys upon the shafts 216 over which the belts 200 and 202 travel are keyed to the shaft 216 and receive their power therefrom. The upper runs of the conveyer belts 200, 201, and 202 are the runs of those belts upon which the sticks of candy travel while being cooled. The upper runs of the conveyer belts 200 and 202 travel from the shaft 211 toward the shaft 216, and the upper run of the conveyer belt 201 travels from the shaft 216 toward the shaft 211. As the stick candy rolls from the chute 199 onto the conveyer belt 200 it is carried toward the shaft 216 until it strikes an upright curved guide plate 217 disposed obliquely across the belt 200 adjacent the shaft 216 which serves to guide the candy off the belt 200 and onto the belt 201, upon which it travels back again toward the shaft 211 until it strikes a guide plate 218 similar to the guide plate 217, disposed across the belt 201 adjacent the shaft 211, and which serves to guide the candy off the belt 201 onto the belt 202. Upon the belt 202 the candy passes back toward the shaft 216 until it strikes a third guide plate 219, similar to 217 and 218, and which guides the candy off the conveyer belt 202 onto the packing table indicated at 204. The pulleys which convey power to the belts 200, 201 and 202 are preferably of the same diameter in order that the belts may travel at the same rates of speed, but preferably the pulleys over which these belts run opposite to their power pulleys are of a slightly smaller diameter that the power pulleys, which arrangement facilitates the passage of the sticks of candy from one conveyer belt on to the succeeding conveyer belt. This difference in size of the pulleys results in making the belt 201 at its end adjacent the guide plate 217 slightly lower in level than the belt 200 and similarly, adjacent the guide plate 218 the belt 202 is slightly lower in level than the belt 201.

At 220 (see Figs. 8 and 17) is shown an air intake pipe supplying air to the blower 106.

221 (see Figs. 1, 3 and 5) is an inlet steam pipe supplying steam to the various heating pipes heretofore described, and 222 is an exhaust pipe for conveying away the waste steam. The grooves 65 of the reducing rollers (see Fig. 6) are provided with roughened or knurled surfaces where such is found desirable, and in practice it has been found helpful to furnish the grooves of the first three pairs of rollers with short studs, as shown in Figs. 2 and 6, to afford a firm grip on the bar of candy as it comes from the batch feeder. The conveyer belt 201 (see Fig. 12) is separated on its upper run from the belts 200 and 202 by upright plates 223 and 224 longitudinally disposed on either side of the upper run of belt 201, their function being to prevent the candy passing from one belt to the other intermediate the pulley ends of the belts. Auxiliary means for reducing the steam pressure and consequently the temperature in the steam boxes 95 and 96 (see Figs. 1 and 5) are provided in faucets 225 and 226 communicating with the interiors of these steam boxes.

The reducing mechanism, the carrier belt, the cutter feeder, and the cutter are so disposed as to maintain the bar of candy in a continuous straight line from the first of the reducing rollers adjacent the smaller end of the batch feeder to the knives of the cutter, and the axis of the batch feeder preferably lies in a vertical plane passing through the axis of the straight bar of candy. The driving gears operating the cutter feeder may be interchanged with gears adapted to drive the parts of the feeder at different speeds to accommodate the machine for rthe production of differing goods. The gears operating the jumping cam of the cutter may likewise be interchanged with gears adapted to rotate the jumping cam at differing speeds for the purpose of varying the length of the sticks. Should it be desired, the jumping cam may be provided with two or more sharp shoulders and indentations for operating the knife a plurality of times to each rotation of the jumping cam.

The grooves 136 and 136$^a$ in the cutter feeder instead of being rubber covered may be knurled, provided with studs or otherwise roughened to increase their grip upon the candy.

In the accompanying drawings and in the foregoing description are set forth preferred embodiments of our invention, but it is obvious that any one skilled in the art may make modifications of the same without departing from the principle of the invention.

We claim:

1. In a candy machine having removable reducing rollers provided with shafts journaled at their rearward ends in a continuous supporting bracket, the combination of a plurality of separate removable supporting brackets in which are journaled the forward ends of said shafts.

2. In a candy machine having a frame, roller shafts and removable rollers upon said roller shafts, the combination of means for removing said rollers from said roller shafts comprising a plurality of separate supporting brackets in which are journaled the forward ends of said shafts, said brackets being removable from said shafts.

3. In a candy machine having reducing rollers, means adjacent said rollers for heating a bar of candy passing therebetween comprising a box adjacent said rollers adapted to convey a heating fluid, and valve-controlled intake and outlet pipes communicating with said box.

4. In a candy machine, the combination of reducing rollers; heating elements under and near the reducing rollers; heating fluid intake and outlet pipes connected with the heating elements; and valves in said pipes controlling the flow of fluid through the latter.

5. In a candy machine having a frame, reducing rollers, and a cutter, means interposed between the reducing rollers and the cutter for cooling candy passing therethrough comprising a carrier belt adapted to convey the candy, an inclosure for said carrier belt, and means for forcing a blast of air upon the candy in said inclosure.

6. In a candy machine having a frame, reducing rollers, a cutter feeder, and a cutter, means interposed between the reducing rollers and the cutter feeder for cooling candy passing therethrough comprising a carrier belt adapted to convey the candy, an inclosure for said carrier belt, and means for forcing a blast of air upon the candy within said inclosure.

7. In a candy machine, the combination of a frame; walls on said frame inclosing a cooling chamber; reducing rollers on said frame at one end of the cooling chamber; a cutter on the frame at the other end of the cooling chamber; a conveyer passing through the chamber; and an air supply pipe opening into the cooling chamber.

8. In a candy machine, the combination of means for forming a bar of candy from a batch, and means for severing said bar of candy into sticks comprising a vertically adjustable anvil having an upwardly protruding cutting edge across which said bar of candy passes, a knife adapted to coöperate with said anvil, a knife holder pivoted at one of its ends and intermediate the ends of which said knife is pivoted, and means for oscillating said knife upon its pivot to coöperate with said anvil.

9. In a candy machine, the combination of means for forming a moving bar of candy from a batch, means for severing said moving bar of candy into sticks, means interposed between said forming means and said severing means for partially cooling said candy, said severing means comprising a vertically adjustable anvil having an upwardly protruding cutting edge across which said moving bar of candy passes, a knife adapted to coöperate with said cutting edge and normally held in spaced relation therefrom and out of contact with said moving bar of candy, a knife holder upon which said knife is pivoted, a shaft upon which said knife holder is pivoted, positive means for oscillating said knife holder, positive means coöperating with said knife holder for increasing the distance of said knife from said cutting edge, a spring member coöperating with said knife holder to cause said knife to strike said moving bar of candy, and tensional means upon said knife coöperating with said knife holder to cause said knife to resume its normal spaced relation from said cutting edge.

10. In a candy machine, the combination of means for forming a moving bar of candy from a batch, means for severing said moving bar of candy into sticks, means interposed between said forming means and said severing means for partially cooling said candy, said severing means comprising a vertically adjustable anvil having an upwardly protruding cutting edge across which said moving bar of candy passes, a knife adapted to coöperate with said cutting edge and normally held in spaced relation therefrom and out of contact with said moving bar of candy, a knife holder upon which said knife is pivoted, a shaft upon which said knife holder is pivoted, positive means for oscillating said knife holder, positive means coöperating with said knife holder for increasing the distance of said knife from said cutting edge, a spring member coöperating with said knife holder to cause said knife to strike said moving bar of candy, tensional means upon said knife coöperating with said knife holder to cause said knife to resume its normal spaced relation from said cutting edge, means for varying at will the force exerted by said spring member, and means for varying at will the normal spaced relation of said knife from said cutting edge.

11. In a candy machine, the combination of means for forming a bar of candy from a batch, means for severing said bar of candy into sticks, means interposed between said forming means and said severing means for partially cooling said candy, said severing means comprising a vertically adjustable anvil having an upwardly protruding cutting edge across which said bar of candy passes, a knife adapted to coöperate with said cutting edge and normally held in spaced relation therefrom and out of contact with said bar of candy, a knife holder upon which said knife is pivoted, a shaft upon which said knife holder is pivoted, positive means for oscillating said knife holder, positive means coöperating with said knife holder for increasing the distance of said knife from said cutting edge, a spring member coöperating with said knife holder to cause said knife to strike said bar of candy, tensional means upon said knife coöperating with said knife holder to cause said knife to resume its normal spaced relation from said cutting edge, means for varying at will the force exerted by said spring member, and means for varying at will the normal spaced relation of said knife from said cutting edge.

12. In a candy machine, the combination of means for forming a moving bar of candy from a batch, and means for severing said moving bar of candy into sticks, comprising an anvil having an upwardly protruding cutting edge across which said moving bar of candy passes, a knife adapted to coöperate with said cutting edge and normally held in spaced relation therefrom and out of contact with said moving bar of candy, a knife holder notched intermediate its extremities and upon which said knife is pivoted, a shaft upon which said knife holder is pivoted, positive means for oscillating said knife upon the pivot of said knife holder to coöperate with said cutting edge comprising a rotating cam wheel adapted to coöperate with the notch in said knife holder.

13. In a candy machine, the combination of means for forming a moving bar of candy and means for severing the bar of candy into sticks, said severing means comprising a cutting knife pivotally mounted and adapted to strike the bar of candy, an anvil having a diagonal slot near one end thereof and a perforation at its other end, a pin engaging said slot and supporting one end of the anvil, an eccentric mounted in said perforation and supporting the other end of the anvil, and means for moving the eccentric causing the latter to adjust the anvil with respect to the bar of candy.

14. In a candy machine, the combination of means for forming a moving bar of candy, and means for severing the candy into sticks, said severing means comprising an anvil mounted adjacent the path of the candy, a cam, a knife holder pivoted at one end and riding on the cam, a spring holding the knife holder against the cam, a knife pivoted on the knife holder and adapted to coöperate with the anvil to cut the bar of candy, an extension on the knife holder, a spring secured on the knife and engaging said extension adapted to hold the knife in normal position on the knife holder, and means for rotating the cam, the latter having a notched periphery permitting the knife holder to swing rapidly and move the knife against the bar of candy.

15. In a candy machine having reducing rollers and means for actuating same at differing speeds and having a carrier belt, a combined cutter-feeder and twister, a cutter, and cooling conveyer belts, the combination of means for conveying power from any one of a plurality of said reducing rollers to said carrier belt, combined cutter and twister, cutter, and cooling conveyer belts.

16. In a candy machine, the combination of means for forming a bar of candy from a batch, means adapted to receive said bar of candy from said forming means and partially cool it comprising a conveyer belt of flexible material and a casing through which said belt travels, said casing being cooled with an air blast, means for severing said bar of candy into predetermined lengths, and means adapted to receive said bar of candy from said cooling means and feed it to said severing means.

17. In a candy machine, the combination of means for forming a bar of candy from a batch, means adapted to receive said bar of candy from said forming means and partially cool it, said last mentioned means comprising an endless belt of suitable flexible material traveling through a cooling space and upon which the said bar of candy is adapted to be carried, and means adapted to receive said bar of candy directly from said endless belt of flexible material and to twist it, whereby the twisting of the bar by the last said means will twist or rotate the bar on the said flexible belt to polish it.

18. In a candy machine, the combination of a conveyer and a twisting and polishing device comprising an endless belt of suitable flexible material adapted to convey an elongated bar of candy, said twisting device comprising a plurality of feeding and twisting rolls located adjacent the delivery end of the belt and adapted to receive the bar of candy therefrom and to twist the bar along said belt to polish it.

19. In a candy machine, the combination of a conveyer and a twisting and polishing device comprising an endless leather belt of suitable flexible material adapted to convey an elongated bar of candy, said twisting device comprising a plurality of feeding and twisting rolls located adjacent the delivery end of the belt and adapted to receive the bar of candy therefrom and to twist the bar along said belt to polish it.

In testimony whereof we have signed our names to this specification, in the presence of two subscribing witnesses, on this 29th day of November, A. D. 1912, and on this 4th day of December, A. D. 1912, respectively.

FREDERICK W. LOVELADY.
BERNARD J. KENNEDY.

Witnesses for Lovelady:
ROBERT A. GILFILLAN,
WM. GILFILLAN.

Witnesses for Kennedy:
S. SMITH,
E. A. JOLY.

Copies of this patent may be obtained for five cents each, by addressing the "Commissioner of Patents, Washington, D. C."